Inventor
F. Beck

Patented Aug. 21, 1928.

1,681,166

UNITED STATES PATENT OFFICE.

FREDERIC BECK, OF NEUILLY, FRANCE, ASSIGNOR TO SOCIETE GENERALE DES MANDRINS "BREVETS BECK," OF PARIS, FRANCE.

AUTOMATIC CHUCK.

Application filed November 21, 1925, Serial No. 70,539, and in France December 23, 1924.

This invention relates to an automatic chuck in which the jaws are moved simultaneously, for holding and centering the tool or the piece of work, by means of a nut with a single or multi-start thread acting through suitable pinions upon the racks forming the base of the jaws.

The industrial product which forms the subject of the invention is essentially characterized by the combination of the following parts.

1. A work or tool carrying plate comprising radial slots for the jaws and provided with a sleeve forming the body of the chuck.

2. A pinion carrying crown placed upon the chuck body in any suitable manner and comprising, for each pinion, a suitably shaped cavity with bearing apertures formed on either side of this cavity for receiving the shaft of the pinion, and 3. A cylindrical nut having one or more threads mounted upon the above mentioned crown and adapted to act through the pinions upon the racks of the jaws.

The invention also relates to the application to the automatic chuck of the above mentioned type of pinions of general ellipsoidal form the teeth of which are incurved towards the ends to suit the threads cut upon the driving nut.

In the accompanying drawing which illustrates diagrammatically, by way of example alone, one form of construction of the invention.

Figure 1:
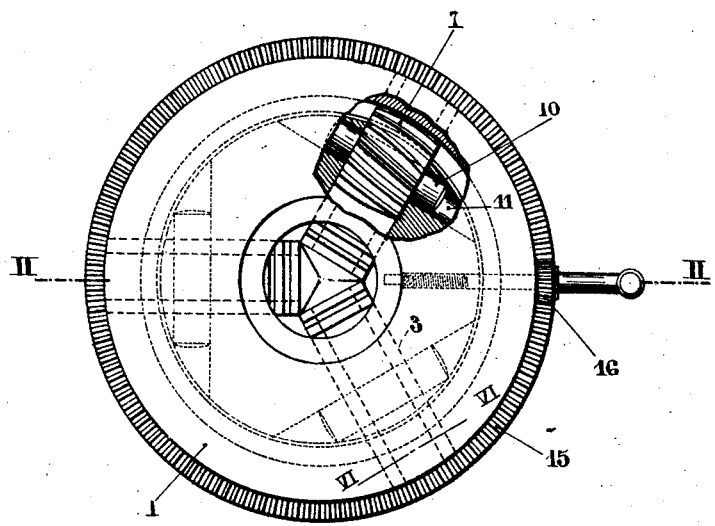
Figure 1 is a front view with a part cut away of the automatic chuck provided with its jaws.
Figure 2:
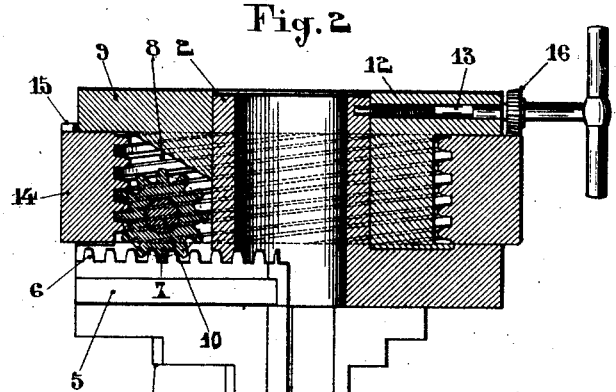
Figure 2 is a section taken along the line II—II in Figure 1.
Figure 4:
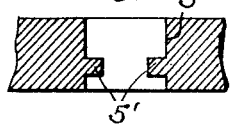
Fig. 4 is a section taken along the line VI—VI of Figure 1.

As shown in Figures 1 and 2 the automatic chuck forming the subject of the invention comprises a tool carrying plate 1, provided with a sleeve 2 the said plate comprising radial slots 3 in which are mounted the jaws 4; the jaws 4 are provided with grooves 5 which engage corresponding projections 5' provided on the sides of the radial slots 3, formed on the tool-carrying plate 1 of the chuck. By virtue of this arrangement the jaws are adapted to slide radially upon the plate 1. The base of each jaw is formed with a rack 6 engaging with the corresponding pinion 7 placed opposite the slot 3. The pinions 7 are placed in cavities 8 spaced equal distances apart and formed in a cylindrical crown 9 which carries the pinions. On either side of the cavities 8 are formed bearing apertures 11 in the body of the crown to enable the shafts 10 of the pinions 7 to be placed in position. The pinions 7 are thus mounted in the cylindrical crown 9 very easily as it is sufficient, after having placed each pinion in one of the cavities 8 to insert the shaft of this pinion in the corresponding bearing apertures and then to secure the said shaft in place by any suitable means, for example by means of a pin fitting in a hole (not shown) provided for this purpose in the body of the crown. In this way an arrangement is obtained which comprises the driving pinions, their shafts and their bearings; this arrangement is then secured to the chuck body by means of set screws 12 engaging in holes 13.

Upon the cylindrical crown 9 carrying the pinions is mounted a cylindrical nut 14 having one or more teeth acting through the pinions 7 upon the racks 6 integrally attached to the jaws. The nut 14 comprises on one of its lateral faces teeth 15 with which it engages the pinion of the key 16 which is employed for rotating the driving nut 14 in the desired direction.

Figure 3:
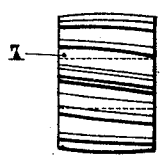
Figure 3 is a view in elevation of one of the chuck pinions.
Figure 5:
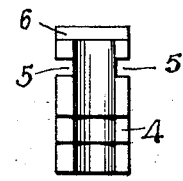
Fig. 5 is a vertical elevation of one of the jaws.

As shown in Figure 3 the pinions 7 have a general ellipsoidal shape and their teeth are curved in towards the ends to suit the threads of the driving nut 14.

The automatic chuck hereinbefore described forms an easy removable arrangement; it greatly facilitates the mounting and dismounting of the constituent parts of the chuck and enables a perfect interchangeability of the jaws to be obtained on account of the perfect connection produced by the pinion carrying crown between the various pinions of the chuck.

Experience has shown that by driving the pinions with the cylindrical nut 14 the wear upon these pinions is much less than in the case of automatic chucks actuated by a worm.

What I claim is:

1. An automatic chuck comprising a work and tool carrying plate slotted at its base for the reception of jaws, said plate being formed with an axial sleeve, jaws having portions arranged in said slots and provided with racks exposed at the surface of said carrying plate, a crown member slidable to its assembled position upon said sleeve, said crown member including pinions mounted in recesses in said crown member and engageable with said racks, said pinions being removable as a unit with said crown member, and a rotatable nut having an internal worm thread engaging said pinions outside of their axes of rotation for operating them.

2. An automatic chuck as claimed in claim 1 in which the nut is provided with external teeth and means engageable with said teeth for operating said nut.

3. An automatic chuck as claimed in claim 1 in which the crown member is provided with chordally directed holes aligned on opposite side of the recesses in which said pinions are mounted, and opening in the side surface of said crown member, shafts for said pinions, introduced through said holes, said nut preventing escape of said shafts.

4. An automatic chuck as claimed in claim 1 wherein the pinions have ellipsoidal teeth curved in a direction to suit the inclination of the thread cut upon the nut.

In testimony whereof I have signed my name to this specification.

FREDERIC BECK.